(No Model.)

B. L. RANDALL.
SAW SET.

No. 279,015. Patented June 5, 1883.

Witnesses.
H. E. Lodge.
Thos. J. Bailey

Inventor.
Bellville L. Randall.
by W. H. Babcock
Attorney.

UNITED STATES PATENT OFFICE.

BELLVILLE L. RANDALL, OF BOSTON, MASSACHUSETTS.

SAW-SET.

SPECIFICATION forming part of Letters Patent No. 279,015, dated June 5, 1883.

Application filed January 3, 1883. (No model.)

*To all whom it may concern:*

Be it known that I, BELLVILLE LLEWELLYN RANDALL, a citizen of the United States, residing at Boston, in the county of Suffolk and State of Massachusetts, have invented certain new and useful Improvements in Automatic Saw-Sets; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention is a saw-set operating to automatically advance the hammer and anvil with each blow of such hammer, the teeth of the saw to be set providing a rack by which said hammer and anvil are advanced a distance corresponding to the varying lengths of such teeth.

Figure 1:
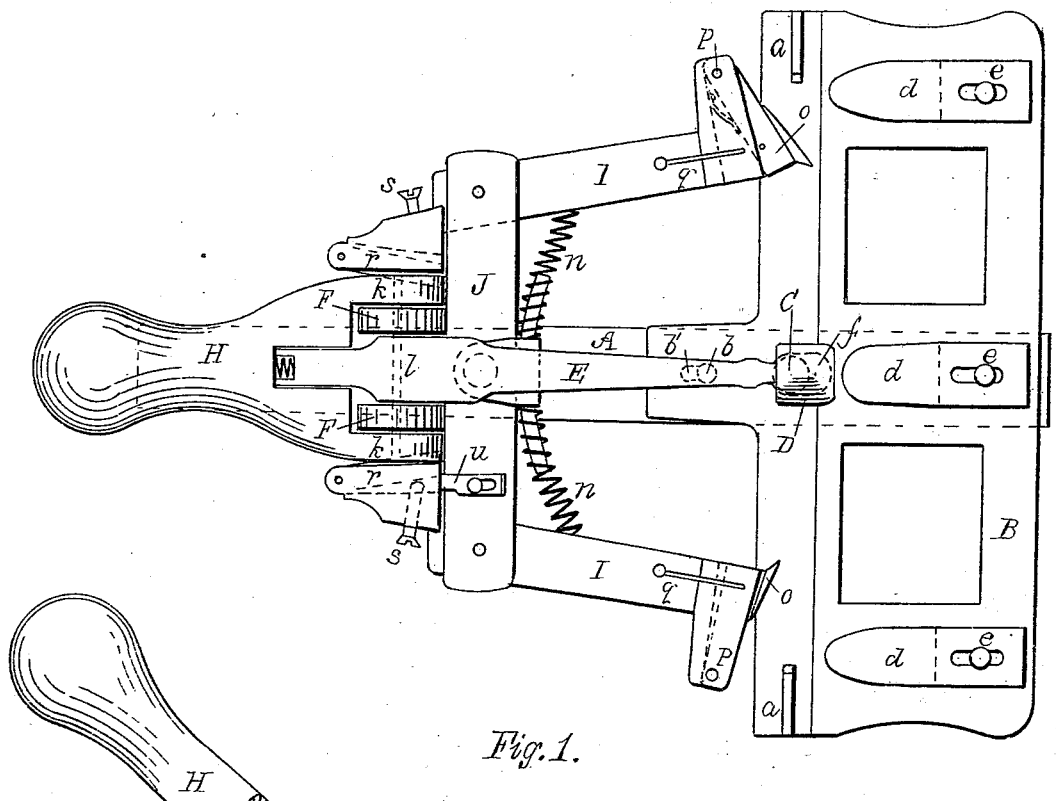
Figure 2:
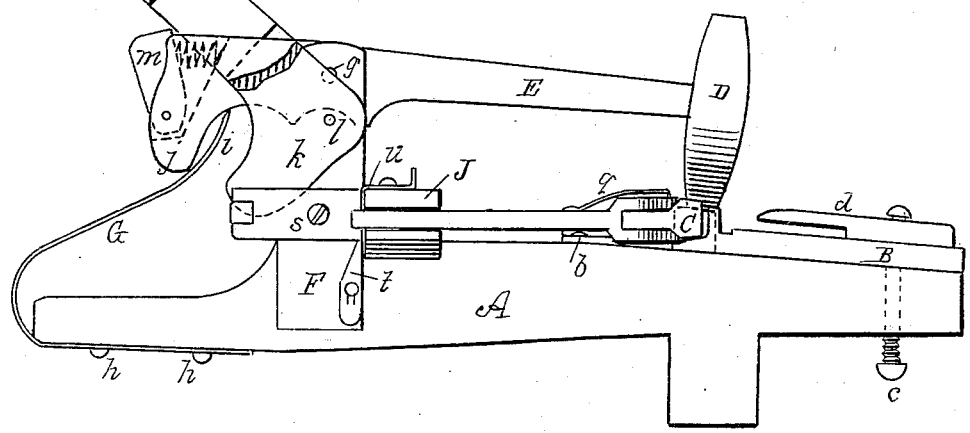

The drawings accompanying this specification represent, in Figure 1, a plan, and in Fig. 2 a sectional side elevation, of a machine containing my invention.

In said drawings the base of support of the implement is a practically straight bar, A, adapted to be held in the operator's hand if the implement is to be moved along a saw, or to be screwed into a vise or otherwise permanently secured if the saw is to be fed along while the implement remains stationary. Upon the outer edge of the bar A, I dispose a rest, B, which serves as a support or bearing for the saw, the inner corners of this rest having raised ledges $a\ a$, which constitute guides to determine the proper position of the saw relative to the hammer and anvil. This rest B is sloping somewhat from a horizontal plane, in order to present the saw at the angle to the anvil to produce the requisite "set" of the teeth; and in order that this slope of the rest may be adjusted according to the degree of set required, I pivot its inner edge to the top of the bar A, as shown at $b$, and I employ a thumb-screw, $c$, screwing through the bar A and against the under side of the outer edge of said rest to raise or lower the latter.

My implement is especially adapted to band-saws or other saws of uniform width, since with this class of saws the operator is not obliged to hold the saw up to the guides $a\ a$ with one hand while he operates the hammer with the other, though the implement may be so used.

To adapt the implement to saws of various widths, I employ guides $d\ d$, &c., secured to the top of the rest B, the guides being rabbeted at their inner under edges to receive the saw, and being secured adjustably to such rest by thumb-screws $e\ e$, &c.

The anvil of the implement is shown at C as a vertical rigid post erected upon the bar A, and passing through a slot, $f$, in the rest B, this anvil being so situated with respect to the guides $a\ a$ as to intercept or extend beneath the teeth of the saw. The pivot $b$ of the rest B extends through a slot, $b'$, in the rest, in order that such rest may be caused to approach or recede from the anvil to adjust the implement to saw-teeth of varying depth.

The hammer of the implement is shown at D, and its helve at E, such helve, toward its rear end, being pivoted by a horizontal pivot, $g$, to or within a furcated standard, F, erected upon the rear part of the bar A. The hammer is caused to descend upon the anvil by a curved plate-spring, G, the base of which extends beneath the rear end of the bar A, and is secured adjustably to the latter by thumb-screws $h\ h$, in order that its position upon such bar with respect to the tail of the hammer-helve may be varied, in order to vary the degree of pressure of the hammer upon the anvil according to the size of the saw-teeth, since it is requisite that the power of the blow of the hammer shall increase with increase in the size of the saw-teeth, and vice versa. The spring G passes upward about the rear end of the bar A, and its free end $i$ extends in front of and bears upon a downwardly-curved horn, $j$, in which the rear end or tail of the hammer-helve terminates. As the end of the spring approaches the lower end of the horn $j$ the leverage of the hammer-helve, and consequently the blow of the hammer, is increased, and vice versa, and this is governed by the position of the base of the spring upon the bar A.

To operate the hammer I employ a handle, H, whose lower end is furcated, thus providing two arms, $k\ k$, which straddle the furcated post F, and are pivoted to the latter by a horizontal pivot, *l*. When the handle H is in an upright position, the hammer is idle upon the anvil. As the handle is thrown back from a vertical to a horizontal position it wipes against and passes by the tail of the hammer-helve, and in so doing raises the hammer, and the latter descends upon the anvil or the saw-tooth upon the latter by the action of the spring G. To permit the handle H, in returning to an upright position, to pass by the tail of the hammer-helve, I pivot at its lower end to the latter a trip-latch, *m*, the operation of which will be readily understood.

To feed the saw automatically along a two-tooth movement after each blow of the hammer, I employ twin jaws I I, dually arranged upon opposite sides of the anvil C, these jaws being each pivoted, near its rear end, to opposite ends of a horizontal bracket, J, secured to the top of the bar A in front of the post F, the two jaws being forced asunder to their utmost limit by coiled springs *n n*, suitably applied, as shown in the drawings. The outer and free ends of these jaws may alternately operate directly with the teeth of the saw to feed the latter, one jaw slipping idly over such teeth, while the other takes into such teeth to feed the saw; but I prefer to construct the implement to avoid the wear of the idle jaw upon the saw-teeth, and to this end I pivot in the outer end of each jaw a horizontal tooth, *o*, the pivot *p* being in the outer end of the tooth and the latter standing in a sloping position, as shown, in order that its free end only shall engage the saw-teeth. The free end of each tooth *o* is pressed outward to a point to engage the teeth of the saw by a spring suitably applied, and is held in a position free from engagement with such teeth by a spring-latch, *q*, secured to the adjacent jaw.

It is obvious that with any change in the length of saw-teeth to be set the length of throw or feed movement of the jaws must be varied, in order that the saw may advance a two-tooth movement with each blow of the hammer. To effect this adjustment of the jaws, I pivot to the inner edge of the tail of each a swinging block, *r*, and outside of each block, and bearing upon it, I screw through the jaw a clamp-screw, *s*. If the screw is screwed in, the blocks *r* are caused to approach the lower ends of the arms *k* of the handle H. Consequently the throw of the jaws is increased. By retracting the screws *s s*, and consequently the blocks *r r*, the throw of the jaws is lessened.

It is also obvious that with any change in the length of saw-teeth the backward or return stroke of the jaws must be varied in order that every other tooth shall be brought directly over the anvil. To effect this by limiting or increasing the retreat movement of each jaw, I employ an adjustable stop in the form of a plate, *t*, secured adjustably to one side of the bar A, and with its upper end tapering or wedge-shaped, and extending in front of an abutment upon the rear end or tail of each lever; or, in lieu of the plate *t*, a stop in the form of a plate, *u*, may be secured adjustably to the top of the bracket J at one end of the latter, and the abutment upon the jaw bring up against this adjustable stop.

In the operation of this implement the saw is laid upon the rest B with its toothed edge bearing against the guides *a a*, and with its teeth passing between the anvil C and hammer D, and with one of the teeth, *o*, of the jaws (according to the direction in which the saw is to be fed) protruding and engaging said teeth. The operator seizes the handle H and lowers it to a horizontal position and returns it to an upright position in rapid succession, the hammer by the act being caused to rise and descend suddenly upon the saw-tooth upon the anvil. As the handle is being lowered and the hammer rises the jaws approach each other, and the saw is fed by one of them a distance equal to the distance between two of its teeth in order to set every alternate tooth. The saw is fed automatically along, and every alternate tooth set, as stated, until the entire saw has been traversed, when the saw is removed from the rest, turned end for end, and the same operation gone through with, which sets the remaining teeth.

I claim—

1. The combination, with the base or bar A, of the rest B, adjustable upon such bar, and provided with the guides *d d*, the anvil C, rigid upon such bar, and the dually-arranged twin jaws I I, operating to feed the saw and bring its teeth alternately in succession over the anvil, substantially as explained.

2. The combination of the bar A, the rest B, adjustable upon the bar A, and provided with the guides *d d*, the spring-impelled hammer D, the rigid anvil C, the dually-arranged twin jaws I I, and the furcated handle operating such jaws, substantially as and for purposes stated.

3. The jaws I I and the furcated handle H, with intermediary agencies for varying the feed movement of such jaws, substantially as specified.

4. The jaws I I and the furcated handle H, with agencies between such jaws and their supports for varying the return or retreat movement of said jaws, substantially as stated.

5. The adjustable blocks *r*, pivoted to the jaws and operating with the furcated handle, to vary the length of feed movement of the jaws, substantially as and for purposes stated.

6. The spring G, in combination with the handle H, and adjustable upon its support, whereby its pressure upon the handle may be raised in extent, substantially as described.

7. The pivoted teeth *o*, in combination with the jaws I, the springs which throw them into engagement with the saw-teeth, and the handle operating on said jaws to cause said teeth to feed the saw, substantially as set forth.

8. The combination, with rest B and anvil

C, of the hammer D, with its spring-impelled helve E, the furcated handle H, and the jaws I I, forced together by such handle under the arrangement substantially as described, whereby the said handle in its descent operates to raise the hammer and feed the saw, substantially as herein described and explained.

In testimony whereof I affix my signature in presence of two witnesses.

BELLVILLE LLEWELLYN RANDALL.

Witnesses:
H. E. LODGE,
THOS. T. BAILEY.